INVENTOR
ROLF EICHACKER
BY [signature]
ATTORNEY

April 26, 1966 R. EICHAKER 3,248,647

ARRANGEMENT FOR THE AUTOMATIC REPRESENTATION OF COMPLEX ELECTRICAL NETWORK CHARACTERISTICS

Filed Feb. 28, 1962 2 Sheets-Sheet 2

INVENTOR.
ROLF EICHACKER
BY Theodore Haefner
ATTORNEY 3,248,647

ARRANGEMENT FOR THE AUTOMATIC REPRESENTATION OF COMPLEX ELECTRICAL NETWORK CHARACTERISTICS

Rolf Eichaker, Zorneding, near Munich, Germany, assignor to Rohde & Schwarz, Munich, Germany, a partnership Filed Feb. 28, 1962, Ser. No. 176,889
Claims priority, application Germany, Mar. 3, 1961, R 29,801
6 Claims. (Cl. 324—57)

Figure 1:
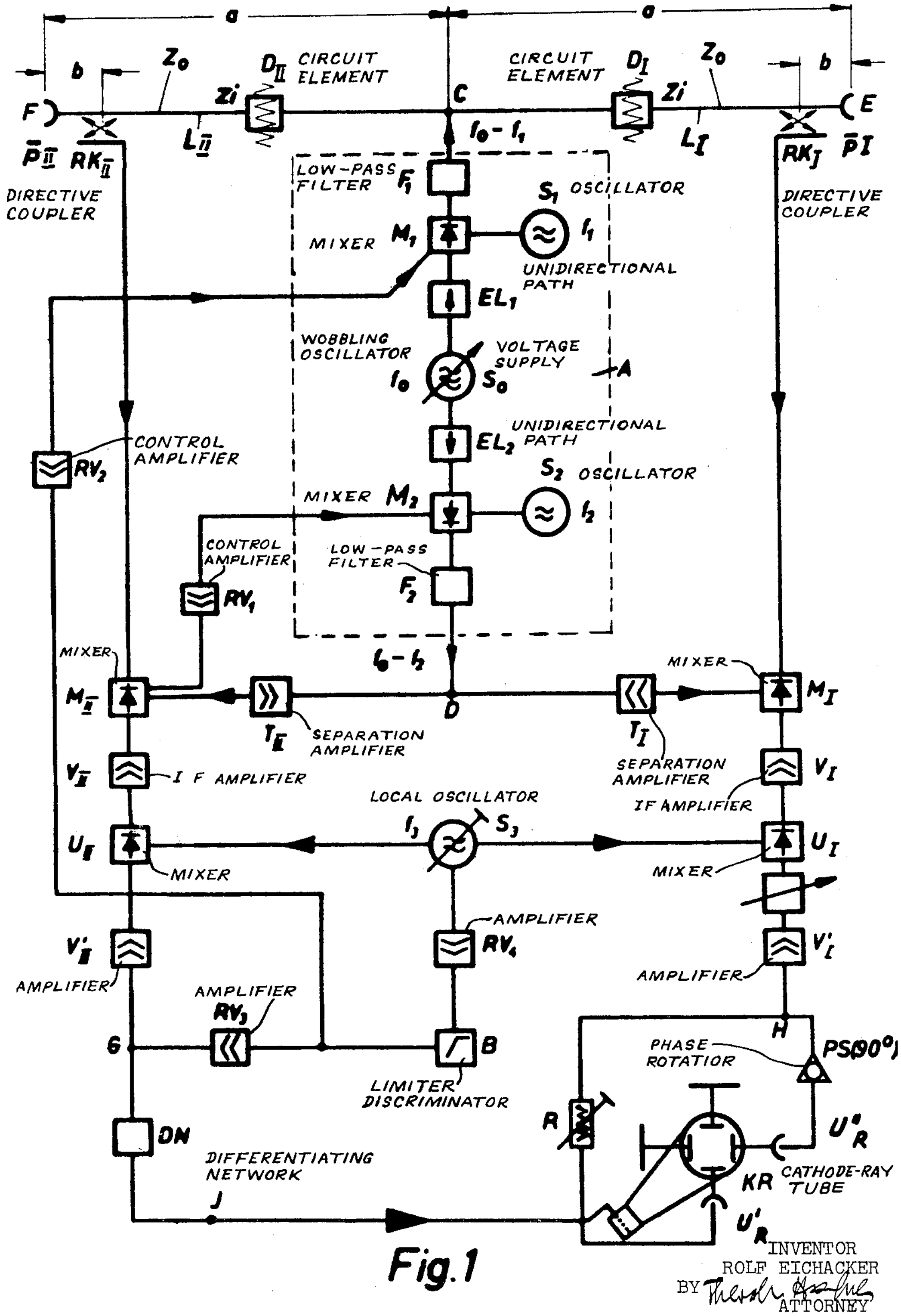

This invention relates to an apparatus for automatically representing characteristics of a complex electrical network.

In order to represent impedance, admittance and other propogation constants, i.e. complex electrical network characteristics in polar coordinates it has been known to use more or less automatic arrangements, see for example German Patents No. 821,052 and 860,669.

In such arrangements bridges, multi-pickup devices on homogeneous transmission lines, or directional couplers are used to obtain voltages corresponding to the reflection coefficient of single or multi-gate networks.

In this connection, a distinction must be made between the so-called video methods in which the high-frequency voltage is handled immediately by quadratic type demodulators, and linear type conversion methods. The first-mentioned methods are less expensive, handling amplitude ranges from 40 to 50 db, depending upon the band width. The second-mentioned conversion methods, handling 60–80 db, are mostly applied to semi-automatic solutions only of the problem because the amount of equipment required is either uneconomically large or the great accuracy attainable by means of linear methods is endangered by the subsequent insertion of quadratic type systems.

It is one of the objects of the invention to avoid the above-mentioned defects by means of an automatic representation of complex electrical network constants in polar coordinates and/or conform projections on a cathode-ray tube or another two-coordinate system recorder.

A more specific object of the invention is to derive from two wave analyzers, such as bridges or directional couplers, symmetrically arranged and supplied voltages that are proportional to the voltages reflected or derived from a network, and to the voltages applied to or incident on the network input, respectively. After conversion of these two voltages of variable frequency into a constant intermediate frequency, the ratio between these voltages is used as a measure of the magnitude of the reflection factor or the network attenuation, and the phase difference between these two voltages corresponds to the phase angle of the reflection factor or the phase rotation of the network.

A further specific object of the invention is to derive from the voltage, proportional to the returning or output wave, a second voltage component of equal magnitude but displaced by 90° in phase, and in an otherwise well known manner, to apply the phase-displaced and the undisplaced voltages to the 90°-displaced deflection fields of a cathode-ray tube to produce a rotating field. On the other hand, the null passage of that voltage which is proportional either to the voltage applied to or incident on the network input is used to produce pulses which are applied to the Wehnelt cylinder of the cathode-ray tube to unblank its beam.

Another object of the invention is to maintain the high measuring accuracy as well as the large attenuation range which can be achieved with conversion methods, even in wobble representation, and at rather modest expense, and at the same time to avoid the disadvantages of the known video methods, as apparent for example from German Patent 1,009,720, with their use of mechanically moving parts, and their small amplitude ranges, thus permitting the invention to be utilized also for measuring the transfer constants of the networks.

In a specific embodiment of the invention, the intermediate frequency voltage that is proportional to the applied voltage is differentiated to produce impulses controlling the opening of the gate circuits and permitting from each of the two 90°-displaced, intermediate frequency voltages which are proportional to the returning wave, to derive an amplitude which is proportional to $p \cdot \cos \sigma$ and $p \cdot \sin \sigma$, respectively, $\sigma$ being the phase angle i.e. the cosine and sine components of the reflected wave, which are applied to the two reflection system of a two-coordinate recorder or cathode-ray tube.

As a result, and as a further object of the invention, the characteristic impedance, admittance or the transfer constant of a network can be reproduced at slow wobble velocity by means of a two-coordinate recorder, as a function of frequency.

Figure 2:
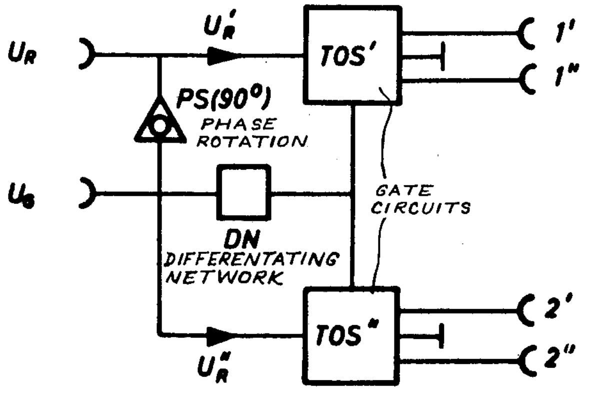

These and other objects of the invention will be more fully apparent from the drawings annexed hereto, in which FIG. 1 shows a circuit diagram embodying an example of the invention and FIG. 2 an accessory circuit therefor.

The circuit symbols of FIGS. 1 and 2 will be explained in the following description.

FIG. 1 shows voltage supply A in which the voltage of a principal, frequency-variable or wobbling oscillator $S_o$ of frequency $f_o$, after decoupling by unidirectional paths $EL_1$, $EL_2$ is mixed in respective stages $\mu_1$, $\mu_2$ with the voltages of oscillators $S_1$, $S_2$ of fixed frequencies $f_1$, $f_2$, respectively, to produce in two separate lines voltages of frequencies $f_o - f_1$ and $f_o - f_2$, respectively. Mixer products $f_o + f_1$ and $f_o + f_2$, respectively, are eliminated from feeder points C and D by means of low-pass filters $F_1$, $F_2$. It is, of course, possible to utilize other arrangements for supplying voltages applied to circuit terminals C and D, and proceeding at a constant frequency interval.

The measuring voltage applied at C is divided into equal halves passing respective circuit elements $D_I$ and $D_{II}$ which insure that the inner resistance $Z_i$ of two lines $L_I$ and $L_{II}$, viewed from measuring terminals E and F, corresponds as accurately as possible to the wave resistance $Z_o$ of these two lines. Circuit elements $D_I$ and $D_{II}$ also serve to prevent any wave components reflected from measuring terminals E and F from entering any other line branch through point C.

The voltages reflected from terminals E and F, after having passed each the same line length arrive through similar line portions $b$ of equal length at directional couplers $RK_I$ and $RK_{II}$ of high directivity. Each of these directive couplers furnishes an output voltage which is proportional to the complex reflection coefficients $\bar{p}_I = p_I e^{j\sigma} I$ and $\bar{p}_{II} = p_{II} e^{j\sigma} II$.

If we now impart to one of these two reflection coefficients, for example $\bar{p}_{II}$, a constant and known amplitude and phase value which is independent of frequency, for example $1 \cdot e^{j.180°}$, then it is possible to derive from the ratio of the two complex intermediate frequency voltages the desired unknown reflection coefficient.

In order to facilitate the work, at the outset, the two reflected voltages are converted by means of a voltage derived from point D and fed over separation amplifiers $T_I$, $T_{II}$ to mixers $M_I$ and $M_{II}$ into a constant intermediate frequency. The band width of succeeding intermediate-frequency amplifiers $V_I$ and $V_{II}$ can be rather amply dimensioned so as to avoid phase or propagation-time errors accompanying variations of frequencies $f_1$ or $f_2$.

If single-sideband modulation is to be applied to the measuring voltages to obtain the heterodyned voltage, or if other methods are to be used, operating with fixed difference frequency, this large bandwidth can be dispensed with, i.e. the bandwidth of amplifiers $V_I$ and $V_{II}$ can be made as small as desired for consideration of amplification and noise level, and as far as necessary for the wobble velocity, and the information content to be represented within the wobble range.

This first frequency conversion can be followed, as indicated in FIG. 1, by further frequency conversions and, if necessary, frequency and phase-control circuits are added. For example, the intermediate-frequency voltage derived at point G from the reference channel is amplified at $RV_3$ and applied to a limiter discriminator B. The control D.C. voltage thus obtained is applied through an amplifier $RV_4$ to a local oscillator $S_3$ the frequency of which is regulated in accordance with the frequency drift until the intermediate frequency prevailing at point G has again assumed its constant value. Oscillator $S_3$ in turn controls second mixers $U_I$ $U_{II}$ in which the intermediate frequency derived from amplifiers $V_I$ $V_{II}$ is again converted and further amplified in amplifiers $V'_I$ $V'_{II}$.

The voltage derived from amplifier $V'_{II}$ is differentiated in a network DN, and the impulses derived from its zero-voltage passages are applied to the Wehnelt cylinder of a cathode-ray tube KR to unblank the cathode-ray beam. Amplifier $V'_I$ is followed by a phase-rotating member PS which produces a 90° phase-displaced return voltage $U''_R$. Undisplaced and phase-displaced return voltages, $U'_R$, $U''_R$, are applied to the vertical and horizontal systems of cathode-ray tube KR, respectively. Depending on which zero passages are utilized for impulse formation, it is necessary to apply these voltages to the cathode-ray tube KR either in the manner shown in FIG. 1 or reversed by 180°.

Depending upon whether the screen of cathode-ray tube KR contains a polar coordinate system or a conform projection thereof, for example a Smith or Carter chart, it is possible directly to read from this coordinate system the complex reflection coefficient or the impedance, as well as the transfer constant of a network inserted between E and F. In the latter arrangement it is necessary to apply voltage $f_O—f_I$ at the part of the network adjacent to F, and not at C.

Furthermore, the example shown in FIG. 1 indicates the following elements:

A control amplifier $RV_1$, through mixer $M_2$ of the voltage-supply circuit, serves to maintain the diodes of mixers $M_I$ and $M_{II}$, or signal source (oscillator) $S_2$ to operate at constant direct current. A control amplifier $RV_2$ maintains constant the voltage prevailing at point G either by controlling the mixing gradient of mixer $M_1$ of the voltage supply circuit, or by adjusting the amplitude of signal source $S_1$, or by an additional, electronically controllable attenuation element.

If we were to apply the voltages fed into the deflection systems of the cathode-ray tube to a two-coordinate recorder to record the result viewed on the picture screen, the frequency should not be much higher than 0.01 to 1 c./s. This, however, is not possible for various reasons.

In accordance with FIG. 2, undisplaced and phase-displaced components $U'_R$ $U''_R$ of voltage $U_R$ are applied to gate circuits TOS' and TOS'', respectively, which receive opening pulses derived through differentiating network DN from voltage $G_G$. These gate-opening pulses serve to produce from voltages $U'_R$, $U''_R$, respectively, amplitudes which are proportional to $p \cdot \cos \sigma$ and $p \cdot \sin \sigma$ respectively.

These amplitudes, if applied with the proper polarity to plates 1', 1'' and 2', 2'' of cathode-ray tube KR, or to the horizontal and vertical terminals of a two-coordinate recorder, permit a representation of $\overline{p}$. The pointed pulses thus obtained are proportional to $p \cdot \cos \sigma$ and $p \cdot \sin \sigma$ and are stored with a time constant which is large compared to the pulse frequency.

The arrangement, therefore, provides registration at slow wobble velocity at time values having an order of magnitude of seconds. It may also be used for representation by an oscillograph, provided suitable charge and discharge constants are selected for the circuit.

I claim:

1. Apparatus for producing a display of the complex characteristics of an electrical network upon a two-coordinate recording device comprising; means for applying a variable frequency voltage to said network, a directive coupler receiviing a voltage from said network to produce a derived voltage proportional to the complex characteristics of said network, means for converting the output of said directive coupler into first and second constant frequency voltages, means for producing a phase shift of 90 degrees in said first constant frequency voltage, means for differentiating said second constant frequency voltage to produce pulses at the zero voltage cross-over points of said voltage, gating circuitry controlled by said pulses, and means for applying said phase displayed constant frequency voltage to the input of said gating circuits whereby said gating circuits are open at predetermined intervals to pass signals having amplitudes proportional to the cosine and sine of the ratio of the derived voltage to the applied voltage, and means for applying said proportional signals to said recording apparatus.

2. A device according to claim 1, wherein said voltage applying means includes a reference network of predetermined characteristics, and a pair of directional couplers connected, respectivley, to said reference network and to the network whose characteristics are to be displayed.

3. A device according to claim 1, wherein said voltage applying means includes a wobblying oscillator, a pair of fixed-frequency oscillators, mixing means to produce from said wobbling oscillator and each of said oscillators, a pair of differential frequencies; one of said differential frequencies being applied to said network; said converting means including means for modulating the other of said differential frequencies together with the voltage derived from said network for producing one of said constant frequency voltages.

4. A device according to claim 3, further comprising a local oscillator, second mixing means connected to said converting means and controlled by said local oscillator, and means under control of said applied voltage for controlling said local oscillator so as to maintain the voltage derived from said second mixing means at a constant frequency.

5. A device according to claim 1, further comprising storage means between the outputs of said gating means and said recording apparatus.

6. A device according to claim 5, wherein said recording apparatus has a polar-coordinate display means.

References Cited by the Examiner

UNITED STATES PATENTS

| | | | |
|---|---|---|---|
| 2,622,127 | 12/1952 | Alsberg et al. | 324—57 |
| 2,760,155 | 8/1956 | Kelly | 324—57 |
| 2,858,425 | 10/1958 | Gordon | 324—79 |
| 2,876,416 | 3/1959 | Vinding | 324—58 |
| 2,931,900 | 4/1960 | Goodman | 324—58 X |
| 2,933,682 | 4/1960 | Moulton et al. | 324—79 |

FOREIGN PATENTS

| | | |
|---|---|---|
| 821,052 | 11/1951 | Germany. |
| 860,669 | 12/1952 | Germany. |

WALTER L. CARLSON, *Primary Examiner.*